(12) United States Patent
Wiffen

(10) Patent No.: US 9,239,070 B2
(45) Date of Patent: Jan. 19, 2016

(54) BOLT MOUNT SYSTEM

(75) Inventor: Trevor J. Wiffen, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 356 days.

(21) Appl. No.: 13/465,429

(22) Filed: May 7, 2012

(65) Prior Publication Data

US 2013/0294861 A1   Nov. 7, 2013

(51) Int. Cl.
*F16B 39/32* (2006.01)
*F16B 21/04* (2006.01)

(52) U.S. Cl.
CPC ..................... *F16B 21/04* (2013.01)

(58) Field of Classification Search
CPC ........ F16B 21/04; F16B 37/044; F16B 39/24; Y10S 411/955; Y10S 411/965; Y10S 411/971; Y10S 411/977; Y10S 411/974
USPC ......... 411/141, 143, 117, 107, 533, 955, 965, 411/977, 984, 453, 111–113, 985, 993
See application file for complete search history.

(56) References Cited

U.S. PATENT DOCUMENTS

| | | | | |
|---|---|---|---|---|
| 1,090,908 | A * | 3/1914 | Dimock | 411/139 |
| 1,269,059 | A * | 6/1918 | D'Arden | 411/117 |
| 1,320,095 | A * | 10/1919 | Robinson | 411/201 |
| 1,350,139 | A * | 8/1920 | Clopton | 411/123 |
| 1,871,684 | A * | 8/1932 | Gibbons | 411/124 |
| 1,985,272 | A * | 12/1934 | Adams | 411/166 |
| 2,192,378 | A * | 3/1940 | Horger | 411/132 |
| 2,431,735 | A * | 12/1947 | Cyr | 411/87 |
| 2,605,806 | A * | 8/1952 | Tinnerman | 411/112 |
| 2,853,113 | A * | 9/1958 | Balint et al. | 411/103 |
| 3,050,097 | A * | 8/1962 | Cochran | 411/107 |
| 3,390,799 | A * | 7/1968 | Szekely | 215/221 |
| 3,430,674 | A * | 3/1969 | Forbush | 411/107 |
| 3,451,456 | A * | 6/1969 | Dey | F16B 39/28 411/166 |
| 3,648,749 | A * | 3/1972 | Warren | 411/87 |
| 3,965,954 | A * | 6/1976 | Lofredo | 411/213 |
| 4,734,001 | A * | 3/1988 | Bennett | 411/119 |
| 4,974,274 | A * | 12/1990 | Compton | B21J 15/12 29/505 |
| 6,122,989 | A * | 9/2000 | Barnes et al. | 74/512 |
| 6,644,902 | B1 * | 11/2003 | Cutshall | 411/111 |
| 6,959,627 | B2 * | 11/2005 | Doran | 81/121.1 |
| 7,137,768 | B2 * | 11/2006 | Maas | 411/553 |
| 2006/0024146 | A1 * | 2/2006 | Fink et al. | 411/103 |

OTHER PUBLICATIONS

Childs, Peter R.N.. (2004). Mechanical Design (2nd Edition)—12.2 Threaded Fasteners. Elsevier. Online version available at:http://app.knovel.com/hotlink/pdf/id:kt00BIDKA7/mechanical-design-2nd/threaded-fasteners.*

* cited by examiner

*Primary Examiner* — Roberta Delisle
(74) *Attorney, Agent, or Firm* — Quinn Law Group, PLLC

(57) ABSTRACT

A mount apparatus for a frame member is provided. The mount apparatus includes a bolt and a retainer. The bolt includes a head, a shank extending from the head, and a tang extending radially from the head. The retainer includes a reactive plate fixing the retainer against rotation relative to the frame member and an engagement slot defined by the retainer having a first wall disposed to prevent positive rotation of the tang.

12 Claims, 4 Drawing Sheets

BOLT MOUNT SYSTEM

TECHNICAL FIELD

This disclosure relates to mounting systems, components, and apparatus for bolts, especially those used to attach heavy components.

BACKGROUND

Body-on-frame is one construction method for vehicles, in which a separate body carries much of the load on the vehicle. In body-on-frame construction, a separate body is mounted to a rigid frame, which usually also supports the drivetrain. The body may be mounted to the frame with fasteners. Unibody construction may use box sections, bulkheads, tubes, stressed skin sections, and combinations thereof to carry vehicle loads. Unibody sections may be mounted together with fasteners.

SUMMARY

A mount apparatus for a frame member is provided. The mount apparatus includes a bolt and a retainer, and may include a nut attachable to the bolt.

The bolt includes a head and a shank extending from the head. The bolt also includes a tang extending radially from the head. The retainer includes a reactive plate fixing the retainer against rotation relative to the frame member. The retainer also includes an engagement slot having a first wall disposed to prevent positive rotation of the tang.

The above features and advantages, and other features and advantages, of the present invention are readily apparent from the following detailed description of some of the best modes and other embodiments for carrying out the invention, which is defined solely by the appended claims, when taken in connection with the accompanying drawings.

DETAILED DESCRIPTION

Figure 1:
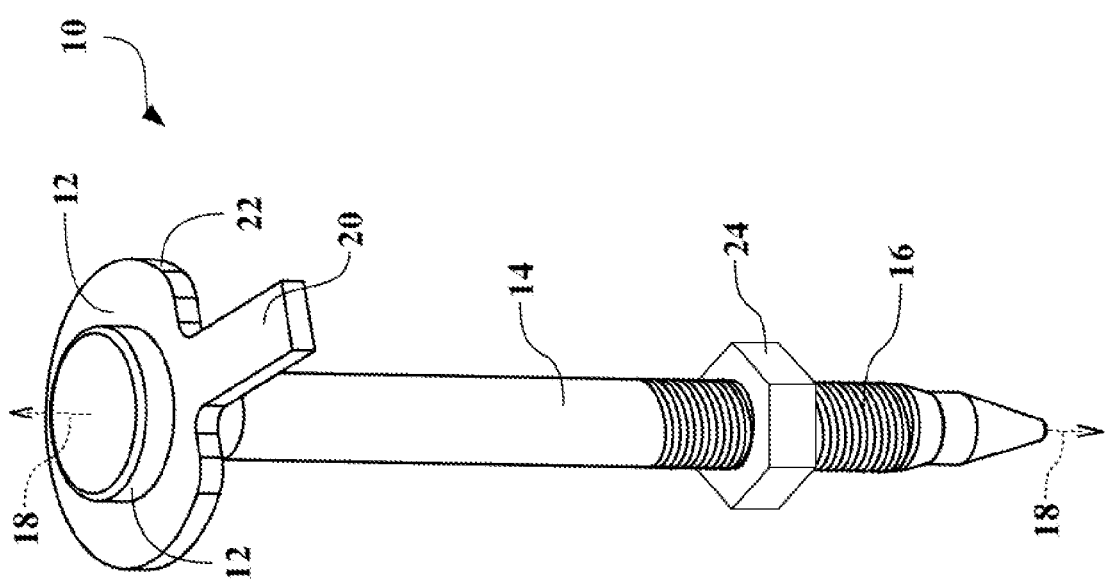
FIG. 1 is a schematic, isometric view of a bolt having a non-drivable head.

Referring to the drawings, wherein like reference numbers correspond to like or similar components wherever possible throughout the several figures, there is shown in FIG. 1 a bolt 10. As discussed in detail herein, the bolt 10 may be used to attach or mount components, particularly heavy components, to a vehicle frame.

While the present invention may be described with respect to automotive or vehicular applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims. Any numerical designations, such as "first" or "second" are illustrative only and are not intended to limit the scope of the invention in any way.

The bolt 10 includes a head 12 or head portion. A body of the bolt 10 extends away (downward, as viewed in the figure) from the head 12, and includes a shank 14 or grip. The body of the bolt 10 also includes a threaded portion 16 on an end of the shank 14 opposite from the head 12.

An axis 18 of the bolt 10 is shown for illustrative purposes. The axial direction refers generally to either direction parallel with the axis 18. For example, the shank 14 extends axially from the head 12. The radial direction is outward from, and generally perpendicular to, the axis 18.

A tang 20 extends radially outward from the head 12. Additionally, in the configuration shown in FIG. 1, the head 12 of the bolt 10 also includes a flat portion 22 extending radially.

A nut 24 is illustrated in FIG. 1. The nut 24 is configured to mate with the threaded portion 16 of the bolt 10. Note that the nut 24 shown is a simple, hexagonal nut, but other types of nuts may be used. One or more washers may also be used with the nut 24 and the bolt 10.

The bolt 10 is illustrated as being a right-handed bolt. Therefore, counterclockwise rotation (as viewed in FIG. 1) tightens the nut 24 and moves it upward (as viewed in FIG. 1) on the threaded portion 16 of the bolt 10.

Figure 2:
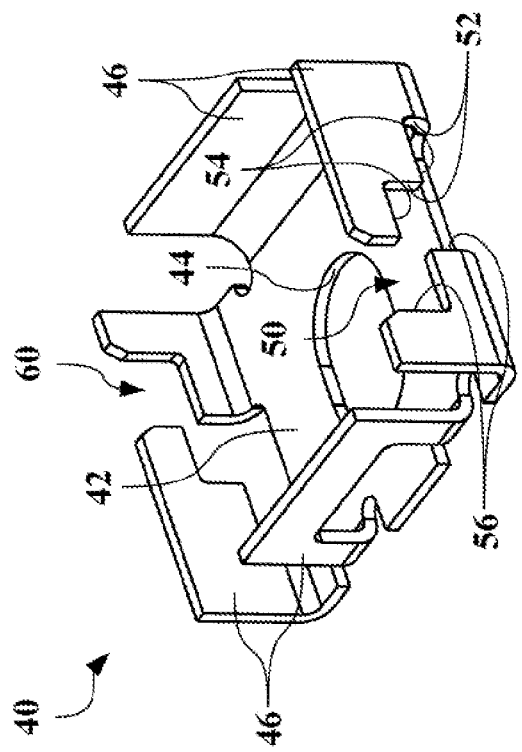
FIG. 2 is a schematic, isometric view of a retainer.

Referring now to FIG. 2, and with continued reference to FIG. 1, there is shown a retainer 40, which is configured for use with the bolt 10 and other bolts having similar features. The retainer 40 shown is formed integrally from a single piece of material. However, other configurations of the retainer 40 may include multiple pieces of material that are subsequently assembled or mated together.

The retainer 40 includes a base plate 42, through which a hole 44 is formed or defined. The hole 44 is sufficiently wide to allow the wider of the shank 14 and the threaded portion of the bolt 10 to pass through. In the retainer 40 shown in the figures, the hole 44 is partly oblong and is also wider than the shank 14 of the bolt 10, allowing for manufacturing or assembly variability.

The retainer 40 includes at least one reactive plate 46. In the example shown in the figures, there are four reactive plates 46, each of which extends generally perpendicular to the base plate 42. At least one engagement slot 50 is formed in at least one of the reactive plates 46.

As will be explained herein, the engagement slot 50 is configured to interface with the tang 20 of the bolt 10. The engagement slot 50 includes at least one first wall 52, at least one second wall 54, and at least one third wall 56.

Figure 3:
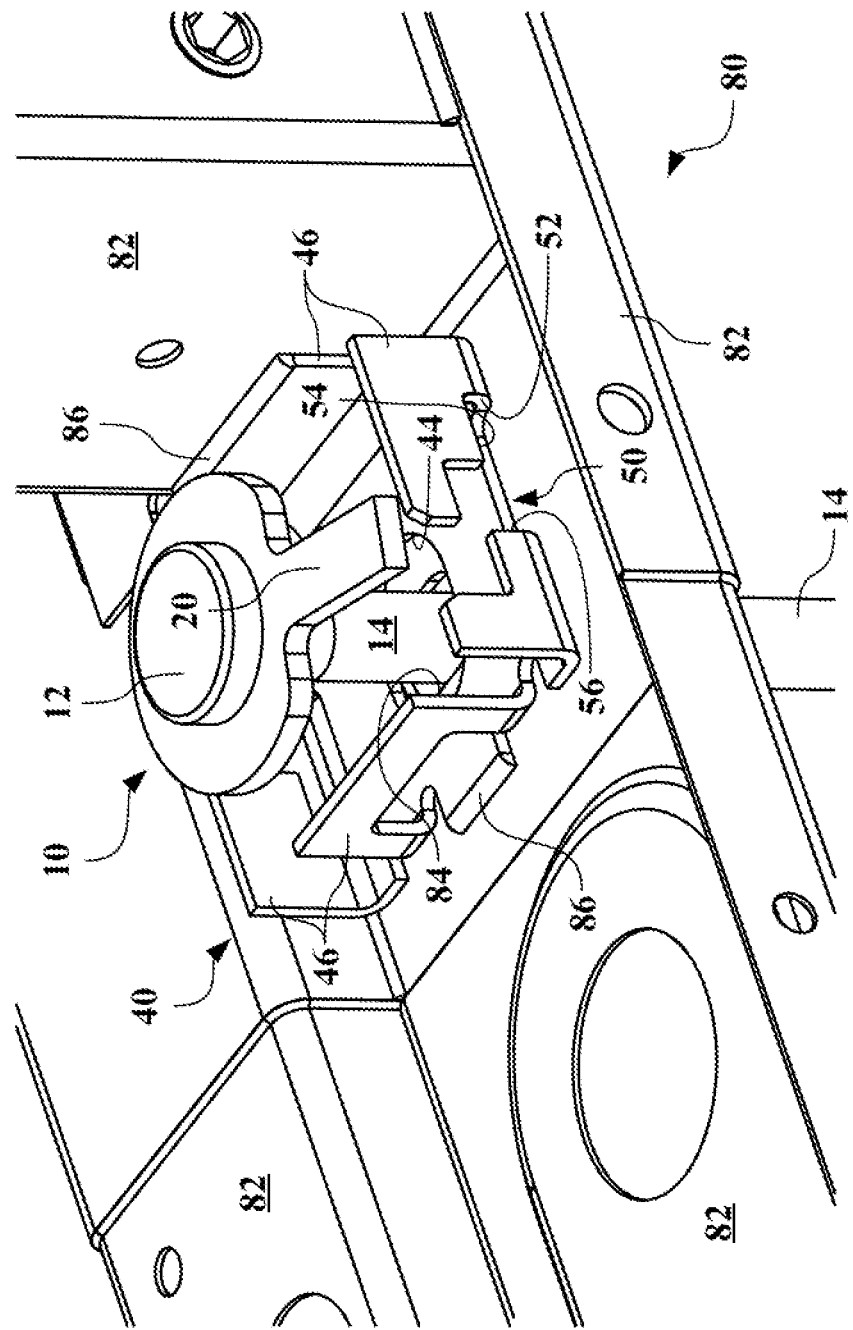
FIG. 3 is a schematic, isometric view of a mounting apparatus using the bolt and the retainer from FIGS. 1 and 2.
Figure 4:
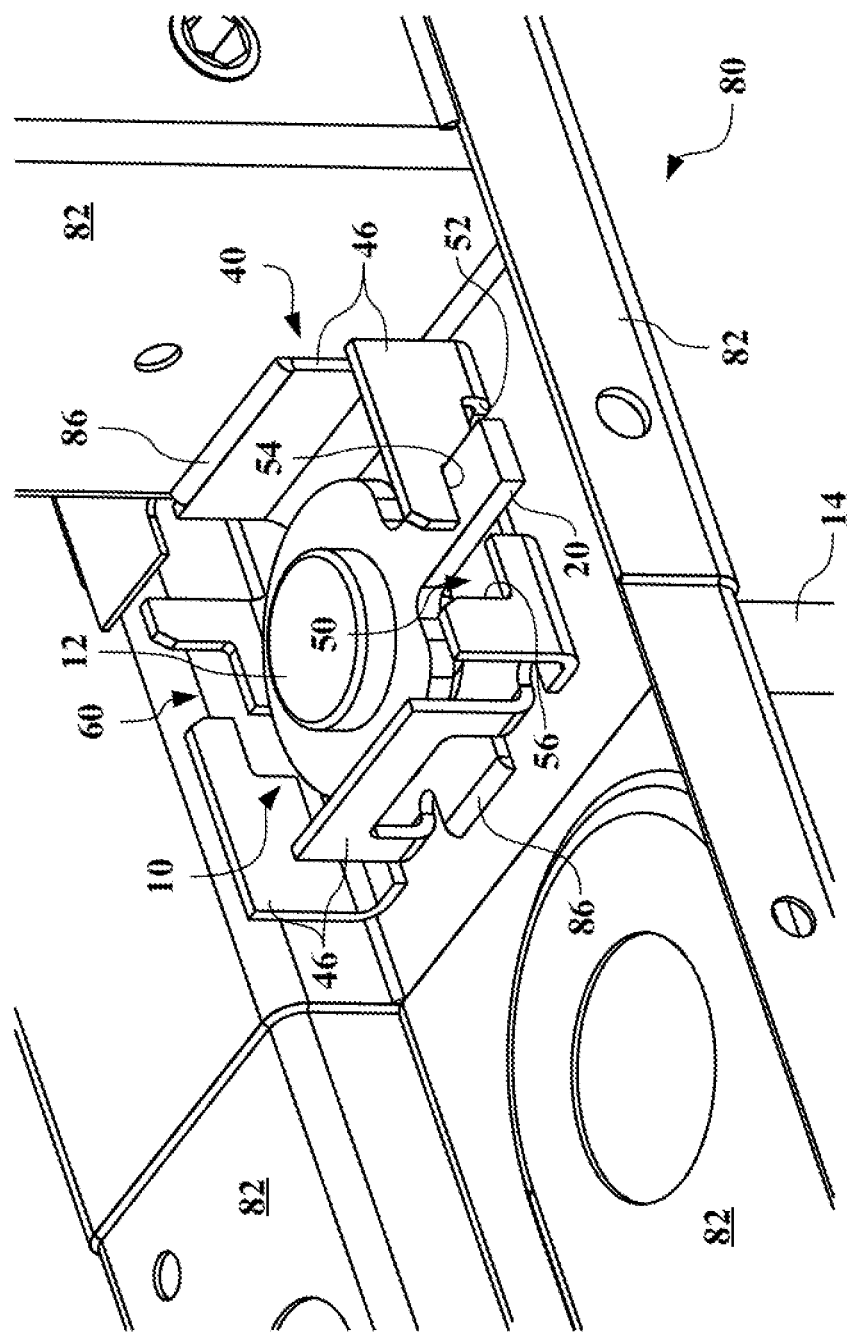
FIG. 4 is a schematic, isometric view of the mounting apparatus of FIG. 3, shown in a different state of assembly.
Figure 5:
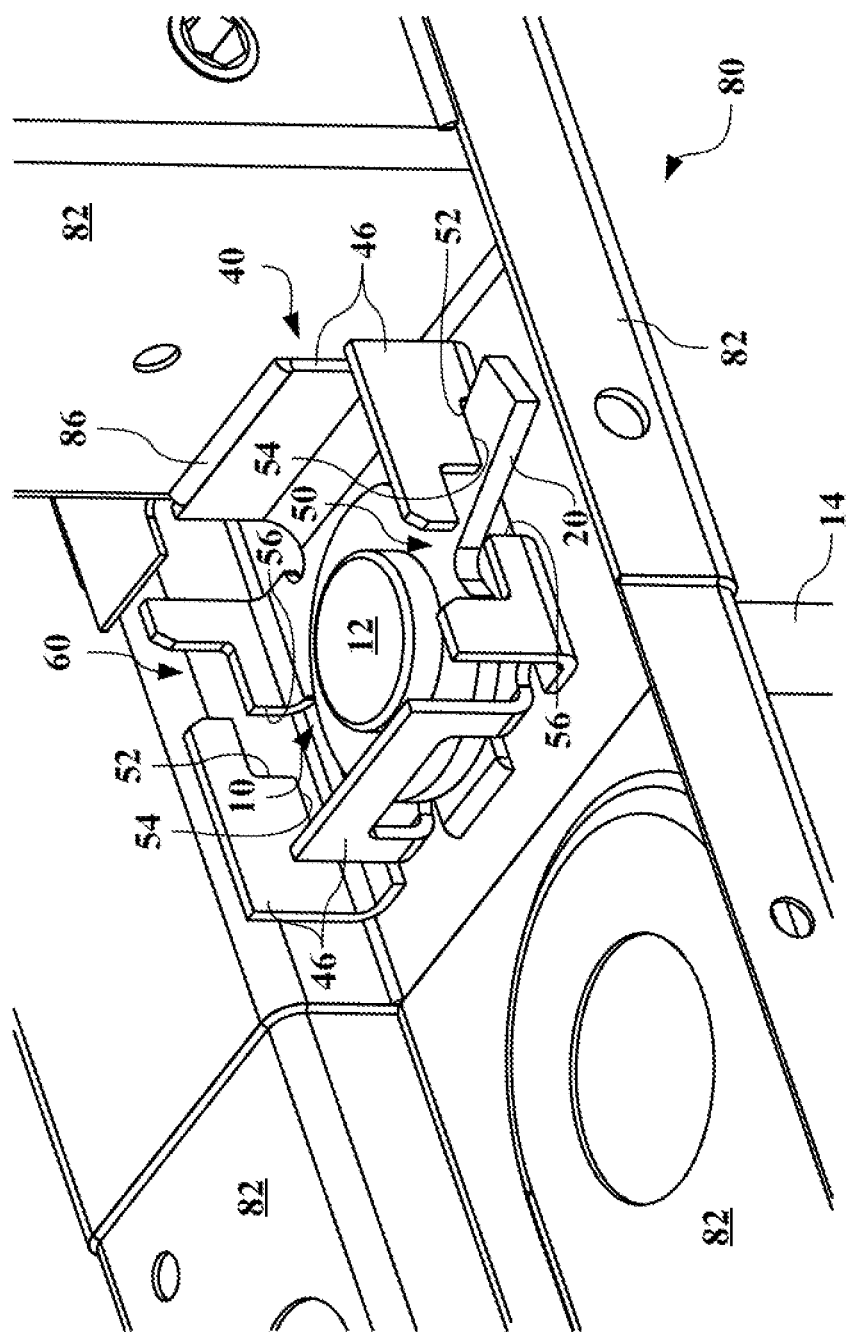
FIG. 5 is a schematic, isometric view of the mounting apparatus of FIGS. 3-4, shown in a different state of assembly.

Referring now to FIG. 3, FIG. 4, and FIG. 5, there are shown three views of the bolt 10 and the retainer 40 interacting with a frame 80 to form a mounting system or mount apparatus. For example, and without limitation, the frame 80 may be a portion of the frame structure for body-on-frame vehicles, and the bolt 10 and retainer 40 may be used to attach a body (not shown) to the frame 80.

FIGS. 3-5 show various stages in attachment and insertion of the bolt 10 to the retainer 40 and the frame 80. FIG. 3 shows the bolt 10 just partially inserted through the hole 44. FIG. 4 shows the bolt 10 with the tang 20 partially within the engagement slot 50, and FIG. 5 shows the tang 20 fully within the engagement slot 50.

The portion of the frame 80 shown includes one or more frame members 82, which may be attached to each other through any suitable means, such as welding. Additional frame member 82 may be hidden from view in FIGS. 3-5 and other components may be removed to better illustrate the mounting apparatus.

The hole 44 of the retainer 40 is generally aligned with a hole 84 formed in one of the frame members 82. The retainer 40 is attached to a portion of the frame 80, such as by one or more weld seams 86 joining one of the reactive plates 46 to one of the adjacent frame members 82. The reactive plate 46 fixes the retainer 40 against rotation, or other forms of movement, relative to the frame 80.

As shown in FIGS. 3-5, the base plate 42 may also be attached to one of the frame members 82, such as by the weld seam 86. The retainer 40 may also be attached by an alternate method, including spot welding, adhesives, or fasteners. Alternatively, the reactive plates 46 may be configured to nestle into a pocket in the frame 80, such that the retainer 40 is prevented from rotating substantially by interference with the adjacent frame members 82, and without the need to fasten the retainer 40 to the frame members 82.

As shown in FIG. 3, during assembly the bolt 10 is inserted through the hole 44 in the retainer 40 and through the hole 84 in the frame member 82 below the retainer 40. The top of the engagement slot 50 is an upward opening, into which the tang 20 may be inserted. As shown in FIGS. 4 and 5, the bolt 10 is rotated and moved downward (as viewed in the figures) during assembly.

The first walls 52 of the engagement slot 50 are disposed to prevent positive rotation of the tang 20. As used herein, "positive" rotation refers to the direction of rotation imparted to the bolt 10 while the nut 24 is being driven onto the threaded portion 16. Therefore, once the tang 20 abuts one of the first walls 52, the bolt 10 will be prevented from rotating in the counterclockwise direction as the nut 24 is driven onto the threaded portion 16.

Without the interaction between the tang 20 and the first wall 52, the bolt 10 would tend to rotate freely as the nut 24 is rotated, which may prevent the nut 24 from tightening onto the threaded portion 16. The first walls 52 also remove the need for a hold-and-drive tool to drive the nut 24 onto the bolt 10.

The second walls 54 of the engagement slot 50 are disposed to prevent push-out of the tang 20. As used herein, "push-out" refers to upward movement of the bolt 10, which may also occur while the nut 24 is being driven onto the threaded portion 16.

The third walls 56 of the engagement slot 50 are disposed to prevent negative rotation of the tang 20. As used herein, "negative" rotation refers to the direction of rotation imparted to the bolt 10 while the nut 24 is being removed from the threaded portion 16. As viewed in the figures, negative rotation causes the bolt 10 to rotate clockwise.

The retainer 40 shown includes multiple first walls 52, second walls 54, and third walls 56. However, only one of each element is necessary to prevent the respective movements. The stepped nature of the engagement slot 50 allows the first walls 52 and the second walls 54 to prevent movement of the bolt 10 during installation even if the tang 20 is not fully inserted into the engagement slot 50.

The bolt 10 is shown with a non-drivable head 12. As used herein, "non-drivable" refers to the inability of the head 12 to be driven to attach the nut 24 to the threaded portion 16. Many bolts have hexagonal or square heads that are configured to interface with a socket or other driver. Other bolts have internal sockets embedded with the head, such as a hexagon socket, fluted socket, screwdriver slot, or square head. However, the head 12 of the bolt 10 is cylindrical, and will not interact with a driver or socket. Alternatively, the head 12 may simply be flat, such that the top surface is planer (with or without the flat portion 22).

As shown in the figures, the retainers have a second engagement slot 60 on the opposing side of the retainer 40 from the first engagement slot 50. The second engagement slot 60 shown substantially mirrors the first engagement slot 50. With the second engagement slot 60, the bolt 10 can rotate 180 degrees in either direction and still have the tang 20 properly engage either the first engagement slot 50 or the second engagement slot 60.

In the retainer 40 shown in the figures, the reactive plates 46 define only two upward openings. As used herein, an "upward opening" is any slot or gap capable of fitting the tang 20, such as the first engagement 50 and the second engagement slot 60. Therefore, the tang 20 can only fit into either the first engagement slot 50 or the second engagement slot 60, and cannot be mistakenly inserted into another opening that does not include the first wall 52 and the second wall 54.

Figure 6:
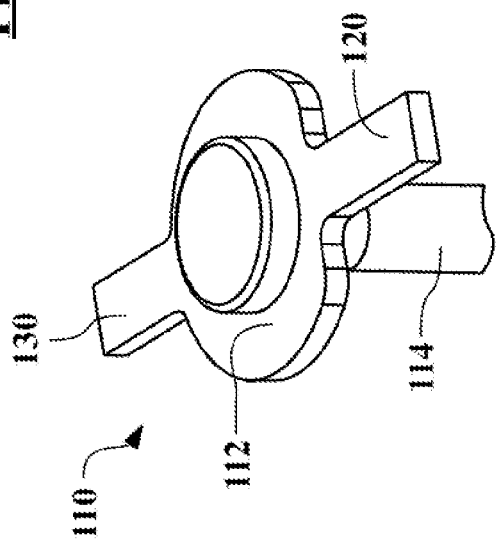
FIG. 6 is a schematic, isometric view of another bolt having a non-drivable head.

Referring now to FIG. 6, and with continued reference to FIGS. 1-5, there is shown an alternative bolt 110, which may be used in similar fashion to the bolt 10 shown in FIGS. 1 and 3-5. Only a portion of the bolt 110 is shown.

The bolt 110 includes a head 112 and a body 114 extending therefrom. The body 114 has a threaded portion (not shown) that interacts with a nut (not shown).

A first tang 120 extends radially outward from the head 112. Additionally, the bolt 110 includes a second tang 130 on the opposing side of the head 112 from the first tang 120. The second tang 130 substantially mirrors the first tang 120.

When the bolt 110 is used with a retainer, such as the retainer 40 shown in FIG. 2, the first tang 120 and the second tang 130 provide substantially equal torque reactions about the body 114 as the nut is driven onto the bolt 110. The chances of the bolt 110 cogging, such that the body 114 angles relative to the hole in which it sits, are reduced due to the balanced torque from the first tang 120 and the second tang 130.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A mount apparatus for a frame member, comprising:
   a bolt, including:
      a head,
      a shank extending from the head,
      a threaded portion extending from the shank opposite to the head, and
      a tang extending radially from the head;
   a retainer, including:
      a reactive plate configured to fix the retainer against rotation relative to the frame member, and
      an engagement slot defined by the retainer and having a first wall disposed to prevent positive rotation of the tang and a second wall extending perpendicularly from the first wall and disposed to prevent push-out of the tang; and
   a nut configured to mate with the threaded portion of the bolt,
   wherein positive rotation of the bolt is the direction of rotation imparted to the bolt by the nut being driven onto the threaded portion of the bolt.

2. The mount apparatus of claim 1, wherein the engagement slot also has a third wall disposed to prevent negative rotation of the tang.

3. The mount apparatus of claim 2, wherein the head is a non-drivable head.

4. The mount apparatus of claim 3, wherein the engagement slot is a first engagement slot, and further comprising:
   a second engagement slot on the opposing side of the retainer from the first engagement slot and substantially mirroring the first engagement slot.

5. The mount apparatus of claim 4, wherein the tang is a first tang, and further comprising:
   a second tang on the opposing side of the head from the first tang and substantially mirroring the first tang.

6. The mount apparatus of claim 5, wherein the reactive plate is configured to be welded to the frame member.

7. The mount apparatus of claim 6, wherein the retainer defines only two upward openings.

8. A mount apparatus for a frame member, comprising:
   a bolt, including:
      a non-drivable head,
      a shank extending from the non-drivable head,
      a threaded portion extending from the shank opposite to the non-drivable head, and
      a tang extending radially from the non-drivable head; and
   a retainer, including:
      a reactive plate fixing the retainer against rotation relative to the frame member, and
      an engagement slot defined by the retainer and having a first wall disposed to prevent positive rotation of the tang, and a second wall extending perpendicularly from the first wall and disposed to prevent push-out of the tang, wherein the second wall extends substantially the width of the tang,
   wherein positive rotation of the bolt is the direction of rotation imparted to the bolt by a nut being driven onto the threaded portion of the bolt.

9. The mount apparatus of claim 8, wherein the engagement slot also has a third wall disposed to prevent negative rotation of the tang.

10. A mount apparatus for a frame member, comprising:
    a bolt, including:
       a head,
       a shank extending from the head,
       a threaded portion extending from the shank opposite to the head, and
       a tang extending radially from the head;
    a retainer, including:
       a reactive plate fixing the retainer against rotation relative to the frame member, and
       an engagement slot defined by the retainer and configured to receive the tang, and having a first wall disposed to prevent positive rotation of the tang, a second wall extending perpendicularly from the first wall and disposed to prevent push-out of the tang, wherein the second wall has two spaced horizontal surfaces extending from the first wall such that the second wall has a stepped configuration, and a third wall disposed to prevent negative rotation of the tang; and
    a nut configured to mate with the threaded portion of the bolt,
    wherein positive rotation of the bolt is the direction of rotation imparted to the bolt by the nut being driven onto the threaded portion of the bolt.

11. The mount apparatus of claim 10, wherein the engagement slot is a first engagement slot, and further comprising:
    a second engagement slot on the opposing side of the retainer from the first engagement slot and substantially mirroring the first engagement slot.

12. The mount apparatus of claim 11, wherein the tang is a first tang, and further comprising:
    a second tang on the opposing side of the head from the first tang and substantially mirroring the first tang.

\* \* \* \* \*